(12) United States Patent
Arai et al.

(10) Patent No.: US 10,693,144 B2
(45) Date of Patent: Jun. 23, 2020

(54) METHOD FOR PRODUCING CATALYST INK, AND CATALYST COMPOSITE

(71) Applicant: TOYOTA JIDOSHA KABUSHIKI KAISHA, Toyota-shi, Aichi-ken (JP)

(72) Inventors: Tatsuya Arai, Susono (JP); Takashi Ozaki, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/921,251

(22) Filed: Mar. 14, 2018

(65) Prior Publication Data
US 2018/0269492 A1 Sep. 20, 2018

(30) Foreign Application Priority Data
Mar. 16, 2017 (JP) ................................. 2017-051127

(51) Int. Cl.
*H01M 4/90* (2006.01)
*H01M 4/86* (2006.01)
(Continued)

(52) U.S. Cl.
CPC ....... *H01M 4/9008* (2013.01); *H01M 4/8657* (2013.01); *H01M 4/8668* (2013.01);
(Continued)

(58) Field of Classification Search
None
See application file for complete search history.

(56) References Cited

U.S. PATENT DOCUMENTS 6,187,468 B1 2/2001 Shinkai et al.
2012/0094215 A1* 4/2012 Satou ................... H01M 4/8605
429/516
(Continued)

FOREIGN PATENT DOCUMENTS

JP 2000164224 A 6/2000
JP 2006286329 A 10/2006
(Continued)

OTHER PUBLICATIONS

Fraga et al.; Properties of Carbon-Supported Platinum Catalysts: Role of Carbon Surface Sites; Journal of Catalysis; 209, 355-364; 2002.*

*Primary Examiner* — Guinever S Gregorio
(74) *Attorney, Agent, or Firm* — Hunton Andrews Kurth LLP (57) ABSTRACT

A method for producing a catalyst ink, by which the surface of a catalyst can be appropriately covered with an ionomer, and the power generation performance of a fuel cell can be excellent in a wide range of humidity environments, and a catalyst composite. The method for producing a catalyst ink may comprise the steps of, for a catalyst composite in which a catalyst is supported on a carbon support with pores, controlling a hydrophilic pores rate of the carbon support to 60% to 80%, and dispersing an ionomer in the catalyst composite after the controlling step, wherein the hydrophilic pores rate is calculated by the following formula (1) using a contact porosimetry method:

Hydrophilic pores rate (%)=(hydrophilic pores volume/total pores volume)×100.  Formula (1)

6 Claims, 3 Drawing Sheets

(51) Int. Cl.
H01M 4/88 (2006.01)
H01M 4/92 (2006.01)
(52) U.S. Cl.
CPC ......... H01M 4/8828 (2013.01); H01M 4/921 (2013.01); H01M 4/926 (2013.01)

(56) References Cited

U.S. PATENT DOCUMENTS

| | | | |
|---|---|---|---|
| 2014/0287344 A1* | 9/2014 | Suzue | H01M 4/86 429/483 |
| 2015/0295250 A1 | 10/2015 | Nagami et al. | |
| 2016/0240862 A1 | 8/2016 | Ishida et al. | |
| 2017/0207463 A1 | 7/2017 | Arai et al. | |

FOREIGN PATENT DOCUMENTS

| | | |
|---|---|---|
| JP | 2015071784 A | 4/2015 |
| JP | 2015076277 A | 4/2015 |
| JP | 2015090851 A | 5/2015 |
| JP | 2015204216 A | 11/2015 |
| JP | 2017126514 A | 7/2017 |
| WO | 2009/105172 A2 | 8/2009 |

\* cited by examiner

METHOD FOR PRODUCING CATALYST INK, AND CATALYST COMPOSITE

CROSS-REFERENCE TO RELATED APPLICATION

The present application claims priority to Japanese Patent Application No. 2017-051127 filed on Mar. 16, 2017, which is incorporated herein by reference in its entirety.

TECHNICAL FIELD

The disclosure relates to a method for producing a catalyst ink, and a catalyst composite.

BACKGROUND

In the field of fuel cells, there is an attempt to increase fuel cell performance, focusing on a catalyst-supporting support.

For example, in Patent Literature 1, it is disclosed to modify the surface of a carbonaceous material that is used as a support, by hydrophilization of the material (paragraph 0089 in Patent Literature 1).

Patent Literature 2 discloses an electrode catalyst for a fuel cell, which is uniformly supported on the surface of a mesoporous carbon support since the average pore diameter of the support corresponds to the average particle diameter of a catalyst complex.

Patent Literature 1: Japanese Patent Application Laid-Open (JP-A) No. 2015-071784

Patent Literature 2: JP-A No. 2015-076277

However, if the surface of the support is hydrophilized too much, flooding may occur when a fuel cell is in a wet state, and the power generation performance of the fuel cell may decrease.

If the support is hydrophilized before the catalyst is supported thereon, the surface state of the support may be changed when the catalyst is supported thereon, and the surface of the catalyst may not be appropriately covered with an ionomer.

SUMMARY

In light of the above circumstance, an object of the disclosed embodiments is to provide a method for producing a catalyst ink, by which the surface of a catalyst can be appropriately covered with an ionomer, and the power generation performance of a fuel cell can be excellent in a wide range of humidity environments. Another object of the present invention is to provide a catalyst composite.

In a first embodiment, there is provided a method for producing a catalyst ink, comprising the steps of, for a catalyst composite in which a catalyst is supported on a carbon support with pores, controlling a hydrophilic pores rate of the carbon support to 60% to 80%, and dispersing an ionomer in the catalyst composite after the controlling step, wherein the hydrophilic pores rate is calculated by the following formula (1) using a contact porosimetry method:

Hydrophilic pores rate (%)=(hydrophilic pores volume/total pores volume)×100    Formula (1)

An average pore diameter of the pores may be 10 nm or less.

The controlling step may include at least one step selected from the group consisting of the steps of:

acid treating the support in a range of from room temperature to 80° C. with a nitric acid solution, before the catalyst is supported on the support;

firing the support in a temperature range of from 150° C. to 2600° C. in an oxygen-containing gas atmosphere, before the catalyst is supported on the support;

bringing the catalyst and the nitric acid solution into contact with the support when the catalyst is supported on the support; and firing the catalyst composite obtained by supporting the catalyst on the support, in a temperature range of from 150° C. to 500° C. in an inactive gas or reducing gas atmosphere.

The ionomer may be dispersed in the catalyst composite with a ball mill in the dispersing step.

The ionomer may be a perfluorosulfonic acid-based resin.

In another embodiment, there is provided a catalyst composite in which a catalyst is supported on a carbon support with pores, wherein a hydrophilic pores rate of the carbon support calculated by the following formula (1) using a contact porosimetry method, is from 60% to 80%:

Hydrophilic pores rate (%)=(hydrophilic pores volume/total pores volume)×100    Formula (1)

An average pore diameter of the pores may be 10 nm or less.

According to the disclosed embodiments, by controlling, in an appropriate range, the hydrophilization degree of the carbon support contained in the catalyst composite before being subjected to the dispersion of the ionomer, the surface of the catalyst can be appropriately covered with the ionomer, and the power generation performance of a fuel cell can be excellent in a wide range of humidity environments.

DETAILED DESCRIPTION

1. The Method for Producing the Catalyst Ink

The method for producing the catalyst ink according to the disclosed embodiments is a method for producing a catalyst ink, comprising the steps of, for a catalyst composite in which a catalyst is supported on a carbon support with pores, controlling a hydrophilic pores rate of the carbon support to 60% to 80%, and dispersing an ionomer in the catalyst composite after the controlling step, wherein the hydrophilic pores rate is calculated by the following formula (1) using a contact porosimetry method:

Hydrophilic pores rate (%)=(hydrophilic pores volume/total pores volume)×100        Formula (1)

For a catalyst composite (catalyst-supporting support) in which catalyst particles such as Pt or Pt alloy particles are supported inside a carbon support with pores, the catalyst particles do not penetrate between the primary particles of the support, and gas easily diffuses to the inside of the support particle aggregates. Therefore, a fuel cell provides a high catalyst particles utilization rate and excellent power generation performance.

However, if the amount of the ionomer introduced to the inside of the pores of the support is large, there is a problem in that flooding occurs inside the pores to decrease the high humidity performance and excessive humidity performance of a fuel cell.

On the other hand, if the amount of the ionomer introduced to the inside of the pores of the support is small, there is a problem in that proton diffusion into the support is inhibited to decrease the low humidity performance of a fuel cell.

It was found that by controlling, in an appropriate range, the hydrophilization degree of the carbon support contained in the catalyst composite before being subjected to the dispersion of the ionomer, the surface of the catalyst can be appropriately covered with the ionomer, and the power generation performance of a fuel cell can be excellent in a wide range of humidity environments.

The method for producing the catalyst ink according to the disclosed embodiments comprises at least (1) the controlling step and (2) the dispersing step.

(1) The Controlling Step

The controlling step is a step of, for a catalyst composite in which a catalyst is supported on a carbon support with pores, controlling a hydrophilic pores rate of the carbon support to 60% to 80%.

The hydrophilic pores rate may be from 60% to 80%. From the viewpoint of increasing the power generation performance of a fuel cell, it may be from 65% to 80%.

The carbon support may be a carbon support with pores. As the carbon support, examples include, but are not limited to, electroconductive carbonaceous materials including carbon particles such as Ketjen Black (product name, manufactured by Ketjen Black International Company), Vulcan (product name, manufactured by Cabot), Norit (product name, manufactured by Norit), Black Pearls (product name, manufactured by Cabot) and Acetylene Black (product name, manufactured by Chevron); carbon fibers such as carbon nanotubes, carbon nanohorns, carbon nanowalls and carbon nanofibers; and carbon alloys.

The average particle diameter of the carbon support is not particularly limited and may be from 10 nm to 100 nm.

The average pore diameter of the inside of the carbon support is not particularly limited and may be 2 nm or more and 10 nm or less. When the average pore diameter is less than 2 nm, the catalyst may not be able to enter the inside of the pores of the support.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

The catalyst may be a catalyst containing at least one selected from the group consisting of platinum and a platinum alloy.

As the platinum alloy, examples include, but are not limited to, an alloy of platinum and a metal material selected from the group consisting of tin, molybdenum, cobalt, iridium, ruthenium, rhodium, nickel and gold. The metal material constituting the platinum alloy may be one or more kinds of metals.

In the case of using the platinum alloy, the platinum content may account for 90 mass % or more of the total mass of the alloy. This is because sufficient catalytic activity and durability cannot be obtained when the platinum content is less than 90 mass %.

The catalyst may be a core-shell catalyst containing a so-called core-shell structure that comprises a core containing a core metal and a shell containing platinum and covering at least a part of the core.

In the disclosed embodiments, the shell covering the core means not only a configuration in which the whole surface of the core is covered with the shell, but also a configuration in which at least a part of the core surface is covered with the shell and a part of the core surface is exposed. Also, the shell may be a monoatomic layer or atomic layers composed of two or more stacked atoms. From the viewpoint of increasing catalytic activity, the shell may be a monoatomic layer.

The core metal may be at least one selected from the group consisting of palladium and a palladium alloy, and it may be palladium.

As the palladium alloy, examples include, but are not limited to, an alloy of palladium and a metal material selected from the group consisting of tungsten, iridium, ruthenium, rhodium, iron, cobalt, nickel, silver and gold. The metal material constituting the palladium alloy may be one or more kinds of metals.

In the case of using the palladium alloy, the palladium content may account for 30 mass % or more of the total mass of the alloy. This is because, when the palladium content is 30 mass % or more, a platinum-containing shell that is uniform in thickness can be formed.

The shell metal material constituting the core-shell catalyst is not particularly limited, as long as it contains at least one selected from platinum and a platinum alloy.

The form of the catalyst is not particularly limited. As the form, examples include, but are not limited to, a plate form and a particle form.

The average particle diameter of the catalyst particles is not particularly limited. It may be 3 nm or more (particularly 3.5 nm or more) and 10 nm or less (particularly 5 nm or less).

In the disclosed embodiments, the state that "a catalyst is supported on a carbon support with pores" is a conception that includes at least one of a state that the catalyst is supported on the surface of the carbon support and a state that the catalyst is supported on the inner wall surface of the inside of the pores of the carbon support.

To support the catalyst on the support, a conventional method can be used. As the conventional method, examples include, but are not limited to, the following method: the catalyst is mixed with a support dispersion having the support dispersed therein, filtered, washed, redispersed in ethanol or the like, and then dried with a vacuum pump, etc., thereby supporting the catalyst on the support. After the drying, the catalyst may be heated as needed.

[The Method for Measuring the Hydrophilic Pores Rate of the Pores of the Carbon Support]

The hydrophilic pores rate is calculated by the following formula (1) using a contact porosimetry method:

Hydrophilic pores rate (%)=(hydrophilic pores volume/total pores volume)×100　　　Formula (1)

The volume of the pores of a porous material is measured by the contact porosimetry method described in Yu. M. Volfkovich, et al. Colloids and Surfaces A 187-188 (2001) 349-365, using mercury. In this method, pressure is applied to cause mercury to enter the pores of a substance, and a specific surface area and a pore distribution are obtained from the pressure and the amount of the mercury caused to enter the pores by the applied pressure.

In this method, by using water and octane in place of the mercury, the volume of hydrophilic pores (water) and the volume of all pores (octane) can be measured.

Then, the hydrophilic pores rate can be calculated by the formula (1).

The controlling step may include at least one step selected from the group consisting of the steps of: (A) acid treating the support in a range of from room temperature to 80° C. with a nitric acid solution, before the catalyst is supported on the support (the step of acid treating the support before supporting the catalyst); (B) firing the support in a temperature range of from 150° C. to 2600° C. in an oxygen-containing gas atmosphere, before the catalyst is supported on the support (the step of firing the support before supporting the catalyst); (C) bringing the catalyst and the nitric acid solution into contact with the support when the catalyst is supported on the support (the acid contact step); and (D) firing the catalyst composite obtained by supporting the catalyst on the support, in a temperature range of from 150° C. to 500° C. in an inactive gas or reducing gas atmosphere (the step of firing the support after supporting the catalyst).

(A) the Step of Acid Treating the Support Before Supporting the Catalyst

The step of acid treating the support before supporting the catalyst, is a step of acid treating the support in a range of from room temperature to 80° C. with a nitric acid solution, before the catalyst is supported on the support.

The hydrophilic pores rate of the carbon support can be increased by carrying out the step of acid treating the support before supporting the catalyst.

In the step of acid treating the support before supporting the catalyst, volatile nitric acid is used. If non-volatile acid is used, removal of the acid is very difficult, and when the acid remains inside the pores of the support, the acid may poison (adsorb to) the catalyst surface and decrease the power generation performance of a fuel cell. In this method, an acid with high oxidizing power and hydrochloric acid, perchloric acid and the like, which leave chloride ions, are not used.

The concentration of the nitric acid is not particularly limited. It may be from 0.1 mol/L to 5 mol/L or from 0.5 mol/L to 1.0 mol/L.

The temperature of the acid treatment may be from room temperature to 80° C., from 70° C. to 80° C., or 80° C.

The time of the acid treatment is not particularly limited. It may be from one hour to 48 hours or from 8 hours to 24 hours. In particular, in the case of using 0.5 mol/L nitric acid, the acid treatment may be carried out at 80° C. for 24 hours or more. In the case of using 1.0 mol/L nitric acid, the acid treatment may be carried out at 80° C. for 8 hours or more.

As the acid treatment, examples include, but are not limited to, the following method: the support, nitric acid, alcohol and ultrapure water are put in a beaker and heated while stirring with a stirrer.

(B) The Step of Firing the Support Before Supporting the Catalyst

The step of firing the support before supporting the catalyst is a step of firing the support in a temperature range of from 150° C. to 2600° C. in an oxygen-containing gas atmosphere, before the catalyst is supported on the support.

The hydrophilic pores rate of the carbon support can be increased by carrying out the step of firing the support before supporting the catalyst.

As the oxygen-containing gas, examples include, but are not limited to, air, dry air and pure oxygen.

The firing temperature may be 150° C. or more or 250° C. or more and 2600° C. or less. When the firing temperature is 2600° C. or less, the diameter of the pores of the support can be appropriately controlled. When the firing temperature is 150° C. or more, the firing time can be shortened.

(C) The Acid Contact Step

The acid contact step is a step of bringing the catalyst and the nitric acid solution into contact with the support when the catalyst is supported on the support.

The hydrophilic pores rate of the carbon support can be increased by carrying out the acid contact step.

The concentration of the nitric acid, the acid contact temperature and the acid contact time are the same as the concentration of the nitric acid, the acid treatment temperature and the acid treatment time of "(A) the step of acid treating the support before supporting the catalyst".

(D) The Step of Firing the Support after Supporting the Catalyst

The step of firing the support after supporting the catalyst is a step of firing the catalyst composite obtained by supporting the catalyst on the support, in a temperature range of from 150° C. to 500° C. in an inactive gas or reducing gas atmosphere.

The hydrophilic pores rate of the carbon support can be decreased by carrying out the step of firing the support after supporting the catalyst. Therefore, when the hydrophilic pores rate of the carbon support is above the desired range, the step of firing the support after supporting the catalyst can be carried out to control the hydrophilic pores rate to be within the desired range.

As the inactive gas, examples include, but are not limited to, nitrogen and argon.

As the reducing gas, examples include, but are not limited to, hydrogen.

The firing temperature may be 150° C. or more or 250° C. or more and 500° C. or less or 450° C. or less. When the firing temperature is 500° C. or less, growth of the catalyst particles (e.g., alloy particles) can be inhibited, and a decrease in catalyst activity can be inhibited. Also, when the firing temperature is 500° C. or less, oxidation of the carbon support by the catalyst particles (e.g., alloy particles) can be inhibited, and a decrease in power generation performance can be inhibited. When the firing temperature is 150° C. or more, the firing time can be shortened.

(2) Dispersing Step

The dispersing step is a step of dispersing an ionomer in the catalyst composite after the controlling step.

By the dispersing step, the ionomer can enter the inside of the pores of the carbon support contained in the catalyst composite and can cover the surface of the catalyst supported on the surface of the carbon support (the inner wall surface of the pores of the carbon support).

In the dispersing step, to disperse the catalyst composite and the ionomer, a dispersion medium is generally added.

The dispersion medium is not particularly limited and may be appropriately selected depending on the ionomer used, etc. As the dispersion medium, examples include, but are not limited to, alcohols such as methanol, ethanol, propanol and propylene glycol, N,N-dimethylformamide, N,N-diethylformamide, N,N-dimethylacetamide, N,N-diethylacetamide, mixtures thereof, and mixtures thereof with water.

The dispersing method is not particularly limited. As the method, examples include, but are not limited to, a homogenizer, a ball mill, a shear mixer and a roll mill. From the viewpoint of increasing dispersibility, a ball mill may be used.

The ball mill is not particularly limited. As the ball mill, examples include, but are not limited to, a planetary ball mill.

The material for the balls of the ball mill is not particularly limited. As the material, examples include, but are not limited to, zirconia and alumina.

The diameter of the balls is not particularly limited and may be from 0.5 mm to 2 mm.

The plate rotational frequency of the ball mill is not particularly limited and may be from 300 rpm to 500 rpm.

The ball mill rotating time is not particularly limited. It may be 3 hours or more or 6 hours or more and 100 hours or less.

In the disclosed embodiments, the ball mill is a conventionally known device for rotating a container in which balls and materials are contained, and it is a conception including a bead mill.

The ionomer may be an ionomer with proton conductivity. As the ionomer, examples include, but are not limited to, a perfluorosulfonic acid-based resin such as Nafion (trademark).

The content of the ionomer in the catalyst ink can be appropriately determined depending on the amount of the carbon support. The mass ratio of the carbon support and the ionomer (carbon support:ionomer) may be from 1:0.5 to 1:1.2 or may be 1:0.75.

In the dispersing step, the ionomer may be added after the solvent is put in a container.

The method for preparing the catalyst ink after the dispersing step, is not particularly limited. As the method, examples include, but are not limited to, the following method: the catalyst contained in the catalyst composite is covered with the ionomer in the dispersing step; the thus-obtained catalyst for a fuel cell is put in a perfluorocarbon sulfonic acid resin dispersion and stirred and mixed, thereby preparing the catalyst ink.

The catalyst ink of the disclosed embodiments can be used as a material for a catalyst layer for a fuel cell.

The method for forming the catalyst layer for a fuel cell is not particularly limited. As the method, examples include, but are not limited to, the following method: the catalyst ink produced by the production method of the disclosed embodiments is applied to a surface of a resin film or metal plate and dried, thereby forming the catalyst layer.

The method for applying the catalyst ink is not particularly limited, and a conventionally known method can be used.

The thickness of the catalyst layer for a fuel cell produced by using the catalyst ink of the disclosed embodiments, is not particularly limited. From the viewpoint of increasing power generation performance, it may be 20 μm or less, or 10 μm or less. From the viewpoint of increasing durability, it may be 3 μm or more.

2. Catalyst Composite

The catalyst composite of the disclosed embodiments is a catalyst composite in which a catalyst is supported on a carbon support with pores, wherein a hydrophilic pores rate of the carbon support calculated by the following formula (1) using a contact porosimetry method is, from 60% to 80%:

$$\text{Hydrophilic pores rate (\%)} = (\text{hydrophilic pores volume/total pores volume}) \times 100 \quad \text{Formula (1)}$$

In the disclosed embodiments, the catalyst composite may be used as a raw material for the catalyst ink produced by the above-described method for producing the catalyst ink.

The carbon support and catalyst of the catalyst composite of the disclosed embodiments will not be described since they are the same as those used in the above-described method for producing the catalyst ink.

EXAMPLES

Example 1

[The Controlling Step]

A mesoporous carbon nanodendrite (MCND) having a pore diameter of 2 nm or more and 10 nm or less (manufactured by Nippon Steel & Sumikin Chemical Co., Ltd.) was prepared as a carbon support.

[The Step of Firing the Carbon Support Before Supporting the Catalyst]

The carbon support was fired at 500° C. for 3 hours in the air atmosphere (flow rate 1 L/min).

Then, PtNi (Pt:Ni=3:1 (molar ratio)) particles was prepared as a catalyst.

The carbon support and the catalyst were immersed in a Pt complex solution (pH 1) and subjected to chemical reduction, thereby supporting the catalyst on the carbon support. Therefore, a catalyst composite was obtained. The hydrophilic pores rate of the carbon support contained in the catalyst composite was 65%.

[The Dispersing Step]

Next, a perfluorocarbon sulfonic acid resin dispersion (product name: Nafion, manufactured by: DuPont) (solid content: 10 mass %, isopropyl alcohol (IPA): 45 mass %, water: 45 mass %) was prepared as an ionomer. In addition, the container of a planetary ball mill and zirconia beads (diameter 1 mm) were prepared.

The zirconia beads, the catalyst composite and the ionomer were put in the container of the planetary ball mill. The container was hermetically closed, absolutely. In putting them in the container, the amounts of the carbon support (C) and the ionomer (I) were controlled at I/C=0.75 (mass ratio). The container was installed in the planetary ball mill (product name: P7, manufactured by: Fritsch) and rotated at a plate rotational frequency of 300 rpm for 6 hours to obtain a catalyst for a fuel cell, which was covered with the ionomer.

The thus-obtained catalyst for a fuel cell, ethanol and water were mixed and stirred to produce a catalyst ink.

<Production of Fuel Cell>

The catalyst ink was as a catalyst ink for a cathode catalyst layer and applied by spraying to one side of a perfluorocarbon sulfonic acid resin film (thickness 10 μm) so that the platinum amount per unit area was 0.2 mg-Pt/cm$^2$. The applied ink was dried to form a cathode catalyst layer. The thickness of the cathode catalyst layer was controlled to 6 μm.

A Pt-supporting carbon support (Pt/C) was used in place of the catalyst composite, and a catalyst ink for an anode catalyst layer, was prepared in the same manner as the above-mentioned dispersing step, the ink containing the Pt/C.

Then, the catalyst ink for an anode catalyst layer was applied by spraying to the other side of the perfluorocarbon sulfonic acid resin film (thickness 10 μm) (i.e., to the side opposite to the side on which the cathode catalyst layer was formed) so that the platinum amount per unit area was 0.2 mg-Pt/cm$^2$.

The applied ink was dried to form an anode catalyst layer, thereby obtaining a membrane catalyst layer assembly. The thickness of the anode catalyst layer was 6 μm.

The thus-obtained membrane catalyst layer assembly was sandwiched by carbon papers for a gas diffusion layer and hot pressed to obtain a membrane electrode assembly (MEA). The membrane electrode assembly was sandwiched by two separators to produce a fuel cell.

Example 2

Figure 1:
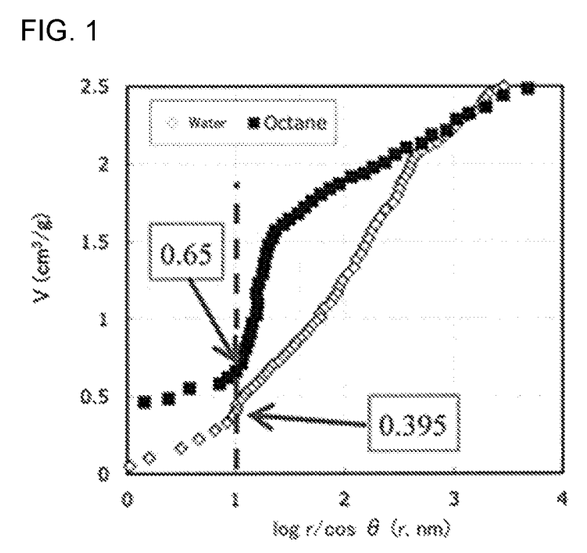
FIG. 1 is a view showing the measurement results of the hydrophilic pores volume and total pores volume of a carbon support contained in the catalyst composite of Example 2.

A catalyst ink was produced in the same manner as Example 1, except that in the controlling step, the carbon support was fired at 450° C. for one hour in an air atmosphere (flow rate 1 L/min). Then, a fuel cell was produced in the same manner as Example 1. The hydrophilic pores rate of the carbon support contained in the catalyst composite was 60%. FIG. 1 shows the measurement results of the hydrophilic pores volume and total pores volume of the carbon support, which were used for calculation of the hydrophilic pores rate of the carbon support contained in the catalyst composite.

In FIG. 1, "r (nm)" of the horizontal axis means the particle diameter or pore diameter of a measured product (the carbon support).

Also in FIG. 1, "V (cm$^3$/g)" of the vertical axis means the accumulated pores volume per unit mass of a measured product (the carbon support).

Example 3

The controlling step described in Example 1 was carried out, except that in place of the step of firing the carbon support before supporting the catalyst, a step of acid treating the carbon support before supporting the catalyst and a step of firing the carbon support after supporting the catalyst, were carried out in the following conditions.

[The Step of Acid Treating the Carbon Support Before Supporting the Catalyst]

The carbon support was immersed and stirred in 1 mol/L (1 N) nitric acid at 80° C. for 48 hours for hydrophilizing treatment. Then, the nitric acid was removed from the carbon support.

Then, PtNi (Pt:Ni=3:1 (molar ratio)) particles were prepared as a catalyst.

Next, the carbon support and the catalyst were immersed in a Pt complex (hexachloroplatinic acid (H$_2$[PtCl$_6$])) solution (pH 1) for chemical reduction, thereby supporting the catalyst on the carbon support. Therefore, a catalyst composite was obtained.

[The Step of Firing the Carbon Support after Supporting the Catalyst]

Then, the catalyst composite was fired at 250° C. for one hour in a hydrogen atmosphere (flow rate 1 L/min).

A catalyst ink was produced in the same manner as Example 1, except for the points mentioned above. Then, a fuel cell was produced in the same manner as Example 1. The hydrophilic pores rate of the carbon support contained in the catalyst composite was 80%.

Comparative Example 1

The controlling step described in Example 1 was carried out, except that in place of the step of firing the carbon support before supporting the catalyst, a step of acid treating the carbon support before supporting the catalyst, was carried out in the following condition.

[The Step of Acid Treating the Carbon Support Before Supporting the Catalyst]

Figure 2:
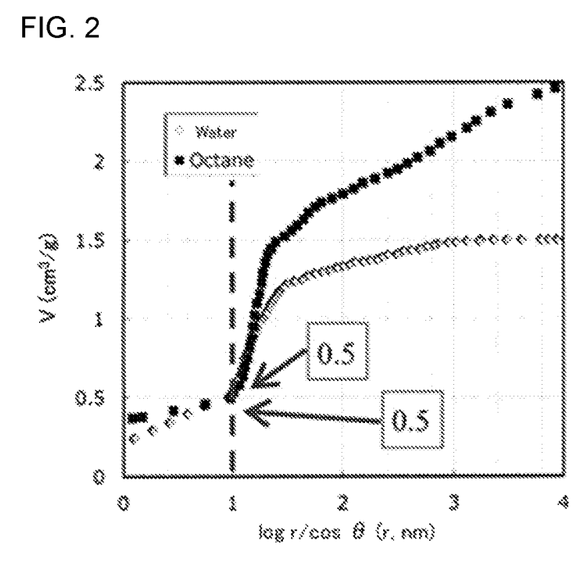
FIG. 2 is a view showing the measurement results of the hydrophilic pores volume and total pores volume of a carbon support contained in the catalyst composite of Comparative Example 1.

The carbon support was immersed and stirred in 1 mol/L (1 N) nitric acid at 80° C. for 48 hours. Then, a catalyst ink was produced in the same manner as Example 1, except that the nitric acid was removed from the carbon support. Then, a fuel cell was produced in the same manner as Example 1. The hydrophilic pores rate of the carbon support contained in the catalyst composite was 100%. FIG. shows the measurement results of the hydrophilic pores volume and total pores volume of the carbon support contained in the catalyst composite.

Comparative Example 2

The controlling step described in Example 1 was carried out, except that in place of the step of firing the carbon support before supporting the catalyst, a step of acid treating the carbon support before supporting the catalyst, was carried out in the following condition.

[The Step of Acid Treating the Carbon Support Before Supporting the Catalyst]

The carbon support was immersed and stirred in 0.5 mol/L (0.5 N) nitric acid at room temperature for 12 hours. A catalyst ink was produced in the same manner as Example 1, except that the nitric acid was removed from the carbon support. Then, a fuel cell was produced in the same manner as Example 1. The hydrophilic pores rate of the carbon support contained in the catalyst composite was 90%.

Comparative Example 3

The controlling step described in Example 1 was carried out, except that in place of the step of firing the carbon support before supporting the catalyst, a step of firing the carbon support after supporting the catalyst, was carried out in the following condition. [The step of firing the carbon support after supporting the catalyst]

The catalyst composite was fired at 450° C. for three hours in a hydrogen (flow rate 1 L/min) atmosphere.

A catalyst ink was produced in the same manner as Example 1, except for the point mentioned above. Then, a fuel cell was produced in the same manner as Example 1. The hydrophilic pores rate of the carbon support contained in the catalyst composite was 50%.

For Examples 1 to 3 and Comparative Examples 1 to 3, the hydrophilic pores rate of the carbon support contained in the catalyst composite, the implemented controlling step, and the treatment condition are shown in Table 1.

For the fuel cells of Examples 1 to 3 and Comparative Examples 2 and 3, the power generation performance ratio with respect to the fuel cell of Comparative Example 1 when the current density (A/cm$^2$ @ 0.6 V) of the fuel cell of Comparative Example 1 in the high humidity (RH 90%) high load condition was determined as 1, is shown in Table 3.

[Power Generation Performance Test in Low Humidity (RH 40%) Condition]

Power generation was carried out by the fuel cells obtained in Examples 1 to 3 and Comparative Examples 1 to 3 in the following condition.

Anode gas: Hydrogen gas at a relative humidity (RH) of 40% (dewpoint 59° C.)

TABLE 1

| | Hydrophilic pores rate | Controlling step | Treatment condition |
|---|---|---|---|
| Comparative Example 1 | 100% | The step of acid treating the carbon support before supporting the catalyst | 1 mol/L nitric acid, 80° C., 48 h, stirring and immersion treatment |
| Comparative Example 2 | 90% | The step of acid treating the carbon support before supporting the catalyst | 0.5 mol/L nitric acid, room temperature, 12 h, stirring and immersion treatment |
| Example 3 | 80% | The step of acid treating the carbon support before supporting the catalyst | 1 mol/L nitric acid, 80° C., 48 h, stirring and immersion treatment |
| | | The step of firing the carbon support after supporting the catalyst | In hydrogen (1 L/min), 250° C., 1 h, firing |
| Example 1 | 65% | The step of firing the carbon support before supporting the catalyst | In air (1 L/min), 500° C., 3 h, firing |
| Example 2 | 60% | The step of firing the carbon support before supporting the catalyst | In air (1 L/min), 450° C., 1 h, firing |
| Comparative Example 3 | 50% | The step of firing the carbon support after supporting the catalyst | In hydrogen (1 L/min), 450° C., 3 h, firing |

[Power Generation Performance Test in High Humidity (RH 90%) Condition]

Power generation was carried out by the fuel cells of Examples 1 to 3 and Comparative Examples 1 to 3 in the following condition.

Anode gas: Hydrogen gas at a relative humidity (RH) of 90% (dewpoint 77° C.)

Cathode gas: Air at a relative humidity (RH) of 90% (dewpoint 77° C.)

Cell temperature (cooling water temperature): 80° C.

Current density-voltage curves were obtained by the power generation.

[High Humidity (RH 90%) Low Load (@ 0.2 A/Cm$^2$) Performance Evaluation]

For the fuel cells of Examples 1 to 3 and Comparative Examples 1 to 3, the voltage (V @ 0.2 A/cm$^2$) in the high humidity (RH 90%) low load condition was measured from the current density-voltage curve obtained by the power generation performance test in the high humidity (RH 90%) condition. The results are shown in Table 2.

For the fuel cells of Examples 1 to 3 and Comparative Examples 2 and 3, the power generation performance ratio with respect to the fuel cell of Comparative Example 1 when the voltage (V @ 0.2 A/cm$^2$) of the fuel cell of Comparative Example 1 in the high humidity (RH 90%) low load condition was determined as 1, is shown in Table 2.

[High Humidity (RH 90%) High Load (@ 0.6 V) Performance Evaluation]

For the fuel cells of Examples 1 to 3 and Comparative Examples 1 to 3, the current density (A/cm$^2$ @ 0.6 V) in the high humidity (RH 90%) high load condition was measured from the current density-voltage curve obtained by the power generation performance test in the high humidity (RH 90%) condition. The results are shown in Table 3.

Cathode gas: Air at a relative humidity (RH) of 40% (dewpoint 59° C.)

Cell temperature (cooling water temperature): 80° C.

Current density-voltage curves were obtained by the power generation.

[Low Humidity (RH 40%) Low Load (@ 0.2 A/Cm$^2$) Performance Evaluation]

For the fuel cells of Examples 1 to 3 and Comparative Examples 1 to 3, the voltage (V @ 0.2 A/cm$^2$) in the low humidity (RH 40%) low load condition was measured from the current density-voltage curve obtained by the power generation performance test in the low humidity (RH 40%) condition. The results are shown in Table 2.

For the fuel cells of Examples 1 to 3 and Comparative Examples 2 and 3, the power generation performance ratio with respect to the fuel cell of Comparative Example 1 when the voltage (V @ 0.2 A/cm$^2$) of the fuel cell of Comparative Example 1 in the low humidity (RH 40%) low load condition was determined as 1, is shown in Table 2.

[Low Humidity (RH 40%) High Load (@ 0.6 V) Performance Evaluation]

For the fuel cells of Examples 1 to 3 and Comparative Examples 1 to 3, the current density (A/cm$^2$ @ 0.6 V) in the low humidity (RH 40%) high load condition was measured from the current density-voltage curve obtained by the power generation performance test in the low humidity (RH 40%) condition. The results are shown in Table 3.

For the fuel cells of Examples 1 to 3 and Comparative Examples 2 to 3, the power generation performance ratio with respect to the fuel cell of Comparative Example 1 when the current density (A/cm$^2$ @ 0.6 V) of the fuel cell of Comparative Example 1 in the low humidity (RH 40%) high load condition was determined as 1, is shown in Table 3.

[Power Generation Performance Test in Excessive Humidity (RH 250%) Condition]

Power generation was carried out by the fuel cells obtained in Examples 1 to 3 and Comparative Examples 1 to 3 in the following condition.

Anode gas: Hydrogen gas at a relative humidity (RH) of 250% (dewpoint 70° C.)
Cathode gas: Air at a relative humidity (RH) of 250% (dewpoint 70° C.)
Cell temperature (cooling water temperature): 50° C.

Current density-voltage curves were obtained by the power generation.

[Excessive Humidity (RH 250%) Low Load (@ 0.2 A/Cm$^2$) Performance Evaluation]

For the fuel cells of Examples 1 to 3 and Comparative Examples 1 to 3, the voltage (V @ 0.2 A/cm$^2$) in the excessive humidity (RH 250%) low load condition was measured from the current density-voltage curve obtained by the power generation performance test in the excessive humidity (RH 250%) condition. The results are shown in Table 2.

For the fuel cells of Examples 1 to 3 and Comparative Examples 2 and 3, the power generation performance ratio with respect to the fuel cell of Comparative Example 1 when the voltage (V @ 0.2 A/cm$^2$) of the fuel cell of Comparative Example 1 in the excessive humidity (RH 250%) low load condition was determined as 1, is shown in Table 2.

[Excessive Humidity (RH 250%) High Load (@ 0.6 V) Performance Evaluation]

For the fuel cells of Examples 1 to 3 and Comparative Examples 1 to 3, the current density (A/cm$^2$ @ 0.6 V) in the excessive humidity (RH 250%) high load condition was measured from the current density-voltage curve obtained by the power generation performance test in the excessive humidity (RH 250%) condition. The results are shown in Table 3.

For the fuel cells of Examples 1 to 3 and Comparative Examples 2 to 3, the power generation performance ratio with respect to the fuel cell of Comparative Example 1 when the current density (A/cm$^2$ @ 0.6 V) of the fuel cell of Comparative Example 1 in the excessive humidity (RH 250%) high load condition was determined as 1, is shown in Table 3.

TABLE 2

|  | Hydrophilic pores rate | Low load performance (V @ 0.2 A/cm$^2$) | | | Performance ratio @ Comparative Example 1 | | | Fuel cell performance decrease rate |
| --- | --- | --- | --- | --- | --- | --- | --- | --- |
|  |  | High humidity (80° C./ 90%RH) | Low humidity (80° C./ 40%RH) | Excessive humidity (50° C./ 250%RH) | High humidity (80° C./ 90%RH) | Low humidity (80° C./ 40%RH) | Excessive humidity (50° C./ 250%RH) | % Low humidity/high humidity |
| Comparative Example 1 | 100% | 0.886 | 0.875 | 0.882 | 1.000 | 1.000 | 1.000 | 98.8% |
| Comparative Example 2 | 90% | 0.886 | 0.875 | 0.882 | 1.000 | 1.000 | 1.000 | 98.8% |
| Example 3 | 80% | 0.891 | 0.886 | 0.889 | 1.006 | 1.013 | 1.008 | 99.4% |
| Example 1 | 65% | 0.890 | 0.878 | 0.885 | 1.005 | 1.003 | 1.003 | 98.6% |
| Example 2 | 60% | 0.889 | 0.876 | 0.874 | 1.003 | 1.001 | 0.991 | 98.6% |
| Comparative Example 3 | 50% | 0.880 | 0.856 | 0.871 | 0.993 | 0.978 | 0.988 | 97.2% |

TABLE 3

|  | Hydrophilic pores rate | High load performance (V @ 0.6 A/cm$^2$) | | | Performance ratio @ Comparative Example 1 | | |
| --- | --- | --- | --- | --- | --- | --- | --- |
|  |  | High humidity (80° C./ 90%RH) | Low humidity (80° C./ 40%RH) | Excessive humidity (50° C./ 250%RH) | High humidity (80° C./ 90%RH) | Low humidity (80° C./ 40%RH) | Excessive humidity (50° C./ 250%RH) |
| Comparative Example 1 | 100% | 3.35 | 2.88 | 2.51 | 1.00 | 1.00 | 1.00 |
| Comparative Example 2 | 90% | 3.35 | 2.88 | 2.51 | 1.00 | 1.00 | 1.00 |
| Example 3 | 80% | 3.54 | 2.96 | 2.68 | 1.06 | 1.03 | 1.07 |
| Example 1 | 65% | 3.72 | 3.17 | 2.96 | 1.11 | 1.10 | 1.18 |
| Example 2 | 60% | 3.59 | 3.00 | 2.78 | 1.07 | 1.04 | 1.11 |
| Comparative Example 3 | 50% | 1.76 | 1.50 | 1.45 | 0.53 | 0.52 | 0.58 |

Figure 3:
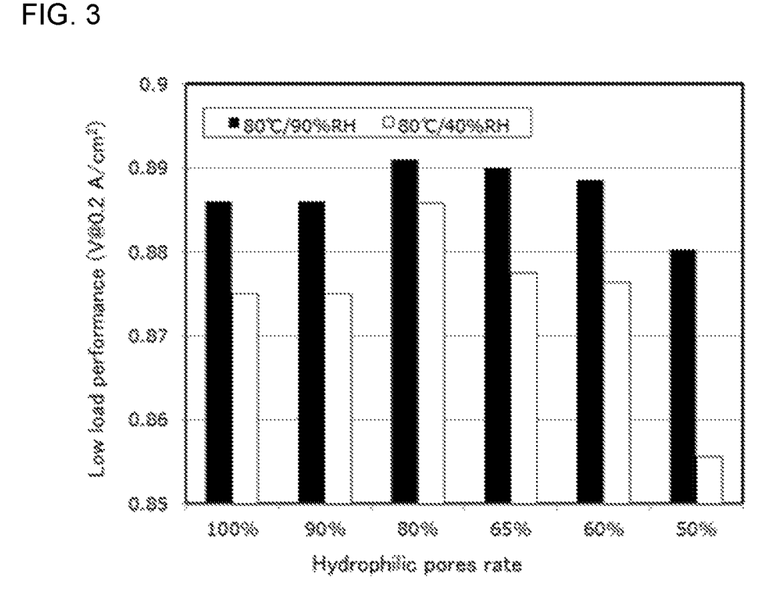
FIG. 3 is a bar chart showing a relationship between the hydrophilic pores rate (%) of the carbon support contained in the catalyst composite of Examples 1 to 3 and Comparative Example 1 to 3 and the high humidity (RH 90%) low load performance (V @ 0.2 A/cm$^2$) of the fuel cells of Examples 1 to 3 and Comparative Examples 1 to 3, and a relationship between the hydrophilic pores rate (%) of the carbon support contained in the catalyst composite of Examples 1 to 3 and Comparative Example 1 to 3 and the low humidity (RH 40%) low load performance (V @ 0.2 A/cm$^2$) of the fuel cells of Examples 1 to 3 and Comparative Examples 1 to 3.

Based on the above results, FIG. 3 shows a bar chart showing a relationship between the hydrophilic pores rate (%) of the carbon support contained in the catalyst composite of Examples 1 to 3 and Comparative Examples 1 to 3 and the high humidity (RH 90%) low load performance (V @ 0.2 A/cm$^2$) of the fuel cells of Examples 1 to 3 and Comparative Examples 1 to 3, and a relationship between the hydrophilic pores rate (%) of the carbon support contained in the catalyst composite of Examples 1 to 3 and Comparative Examples 1 to 3 and the low humidity (RH 40%) low load performance (V @ 0.2 A/cm$^2$) of the fuel cells of Examples 1 to 3 and Comparative Examples 1 to 3.

Figure 4:
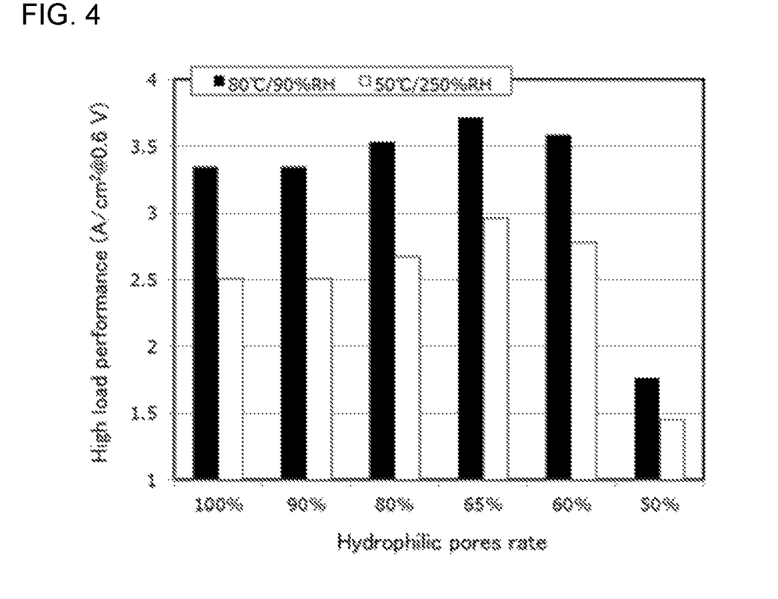
FIG. 4 is a bar chart showing a relationship between the hydrophilic pores rate (%) of the carbon support contained in the catalyst composite of Examples 1 to 3 and Comparative Examples 1 to 3 and the high humidity (RH 90%) high load performance (A/cm$^2$ @ 0.6 V) of the fuel cells of Examples 1 to 3 and Comparative Examples 1 to 3, and a relationship between the hydrophilic pores rate (%) of the carbon support contained in the catalyst composite of Examples 1 to 3 and Comparative Examples 1 to 3 and the excessive humidity (RH 250%) high load performance (A/cm$^2$ @ 0.6 V) of the fuel cells of Examples 1 to 3 and Comparative Examples 1 to 3.

FIG. 4 shows a bar chart showing a relationship between the hydrophilic pores rate (%) of the carbon support contained in the catalyst composite of Examples 1 to 3 and Comparative Examples 1 to 3 and the high humidity (RH 90%) high load performance (A/cm$^2$ @ 0.6 V) of the fuel cells of Examples 1 to 3 and Comparative Examples 1 to 3, and a relationship between the hydrophilic pores rate (%) of the carbon support contained in the catalyst composite of Examples 1 to 3 and Comparative Examples 1 to 3 and the excessive humidity (RH 250%) high load performance (A/cm$^2$ @ 0.6 V) of the fuel cells of Examples 1 to 3 and Comparative Examples 1 to 3.

For the fuel cells of Examples 1 to 3 and Comparative Examples 1 to 3, the ratio of the low humidity (RH 40%) low load (@ 0.2 A/cm$^2$) condition with respect to the high humidity (RH 90%) low load (@ 0.2 A/cm$^2$) condition, was calculated as a fuel cell performance decrease rate ((voltage in low humidity low load condition/voltage in high humidity low load condition)×100) (%). The results are shown in Table 2.

Figure 5:
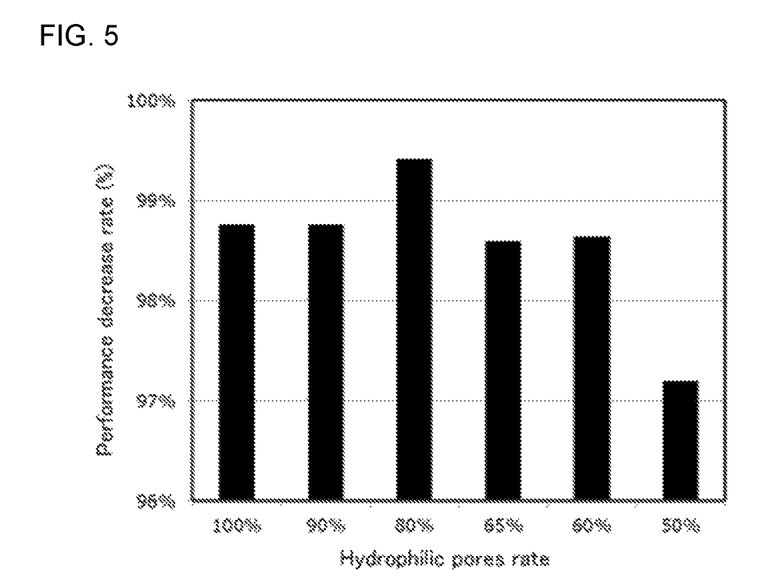
FIG. 5 is a bar chart showing a relationship between the hydrophilic pores rate (%) of the carbon support contained in the catalyst composite of Examples 1 to 3 and Comparative Examples 1 to 3 and a fuel cell performance decrease rate ((voltage in low humidity low load condition/voltage in high humidity low load condition)×100)(%).

FIG. 5 shows a bar chart showing a relationship between the hydrophilic pores rate (%) of the carbon support contained in the catalyst composite of Examples 1 to 3 and Comparative Examples 1 to 3 and the above-described fuel cell performance decrease rate ((voltage in low humidity low load condition/voltage in high humidity low load condition)×100) (%).

As is clear from Table 2, in the low load (@ 0.2 A/cm$^2$) condition, by increasing the hydrophilic pores rate of the carbon support contained in the catalyst composite higher than 50%, the power generation performance of a fuel cell can be increased in all of the high humidity, low humidity and excessive humidity conditions, compared to the catalyst composite containing the carbon support that the hydrophilic pores rate is 50%. The reason is considered as follows: when the hydrophilic pores rate is too low, the ionomer cannot enter the inside of the pores of the carbon support and covers the outside of the particles of the catalyst composite; therefore, resistance to proton transfer to the catalyst metal inside the pores and gas diffusion resistance of an oxidant are increased, thereby decreasing the power generation performance.

It is also clear that by controlling the hydrophilic pores rate of the carbon support contained in the catalyst composite in a range of from 60% to 80%, in all of the high humidity and low humidity conditions, the power generation performance of a fuel cell can be increased by 0.1% or more, compared to the case of using the catalyst composite containing the carbon support that the hydrophilic pores rate is 100%. When the hydrophilic pores rate is too high, it is considered that the coverage of the catalyst metal with the ionomer is increased and, as a result, the catalyst metal is poisoned by the ionomer; therefore, there is a decrease in catalytic activity and, as a result, the power generation performance of a fuel cell is decreased. Therefore, it is considered that by decreasing the hydrophilic pores rate from 100% to an appropriate level, an appropriate amount of the ionomer can be retained inside the pores of the carbon support, and the poisoning of the catalyst metal by the ionomer, a decrease in catalytic activity, and a decrease in power generation performance of a fuel cell can be inhibited.

In the excessive humidity condition, when the catalyst composite containing the carbon support that the hydrophilic pores rate is 60%, is used, the power generation performance of a fuel cell is inferior compared to the case of using the catalyst composite containing the carbon support that the hydrophilic pores rate is 100%. However, it is clear that by controlling the hydrophilic pores rate of the carbon support contained in the catalyst composite in a range of from 65% to 80%, the power generation performance of a fuel cell can be increased by 0.3% to 0.8% compared to the case of using the catalyst composite containing the carbon support that the hydrophilic pores rate is 100%.

It is clear that in the low load (@ 0.2 A/cm$^2$) condition, by using the catalyst composite containing the carbon support that the hydrophilic pores rate is from 65% to 80% or is especially 80%, in all of the high humidity, low humidity and excessive humidity conditions, the power generation performance of a fuel cell can be increased by 0.3% or more, compared to the case of using the catalyst composite containing the carbon support that the hydrophilic pores rate is outside the range.

As is clear from Table 3, in the high load (@ 0.6 V) condition, by increasing the hydrophilic pores rate of the carbon support contained in the catalyst composite higher than 50%, the power generation performance of a fuel cell can be increased in all of the high humidity, low humidity and excessive humidity conditions, compared to the catalyst composite containing the carbon support that the hydrophilic pores rate is 50%. The reason is considered as follows: when the hydrophilic pores rate is too low, the ionomer cannot enter the inside of the pores of the carbon support and covers the outside of the particles of the catalyst composite; therefore, resistance to proton transfer to the catalyst metal inside the pores and gas diffusion resistance of an oxidant are increased, thereby decreasing the power generation performance.

It is also clear that by controlling the hydrophilic pores rate of the carbon support contained in the catalyst composite in a range of from 60% to 80%, in all of the high humidity, low humidity and excessive humidity conditions, the power generation performance of a fuel cell can be increased by 3% or more, compared to the case of using the catalyst composite containing the carbon support that the hydrophilic pores rate is 100%. When the hydrophilic pores rate is increased, the ionomer can easily enter the inside of the pores of the carbon support. However, when the hydrophilic pores rate is too high, it is considered that the ionomer can easily enter the inside of the pores of the carbon support and, as a result, the ionomer clogs the inside the pores of the carbon support, causes flooding and results in a decrease in power generation performance. Therefore, it is considered that by decreasing the hydrophilic pores rate from 100% to an appropriate level, an appropriate amount of the ionomer can be retained inside the pores of the carbon support, and the clogging of the inside of the pores with the ionomer, the occurrence of flooding by the clogging, an increase in gas diffusion resistance, and a decrease in power generation performance of a fuel cell can be inhibited.

It is clear that especially in the high load (@ 0.6 V) condition, by using the catalyst composite containing the carbon support that the hydrophilic pores rate is 65%, in all of the high humidity, low humidity and excessive humidity conditions, the power generation performance of a fuel cell can be increased by 10% or more, compared to the case of using the catalyst composite containing the carbon support that the hydrophilic pores rate is 100%.

As is clear from Table 2 and FIG. 5, in the low load (@ 0.2 A/cm$^2$) condition, if the hydrophilic pores rate of the carbon support contained in the catalyst composite is higher than 50%, a decrease in fuel cell performance when the humidity condition is changed from the high humidity condition to the low humidity condition, can be reduced. It is also clear that if the hydrophilic pores rate of the carbon support contained in the catalyst composite is 60% or more, a decrease in fuel cell performance when the humidity condition is changed from the high humidity condition to the low humidity condition, can be reduced to 2% or less (more specifically, within 1.4% to 0.6%). It is presumed that if the fuel cell performance decrease rate changes by 2%, the catalytic activity increases by about two times.

It is also clear that by using the catalyst composite containing the carbon support that the hydrophilic pores rate is 80%, a decrease in fuel cell performance can be remarkably reduced (to 0.6% or less) compared to the case of using the catalyst composite containing the carbon support that the hydrophilic pores rate is not 80%.

From the above results, it is considered that by controlling the hydrophilic pores rate of the carbon support contained in the catalyst composite to 80% or less, an appropriate amount of the ionomer can be retained inside the pores of the carbon support, and the clogging of the inside of the pores with the ionomer, the occurrence of flooding caused by the clogging, an increase in gas diffusion resistance, and a decrease in power generation performance of a fuel cell can be inhibited.

It is also considered that by controlling the hydrophilic pores rate to 80% or less, an appropriate amount of the ionomer can be retained inside the pores of the carbon support, and the poisoning of the catalyst metal by the ionomer and a decrease in catalytic activity can be inhibited.

Also, by controlling the hydrophilic pores rate to 60% or more, the ionomer can easily enter the inside of the pores of the carbon support; covering of the outside of the particles of the catalyst composite with the ionomer can be inhibited; and an appropriate amount of the ionomer can be retained inside the pores of the carbon support.

Therefore, it is considered that an increase in resistance to proton transfer to the catalyst metal inside the pores and gas diffusion resistance of an oxidant can be inhibited, and a decrease in power generation performance can be inhibited.

Therefore, it is clear that by increasing the hydrophilic pores rate of the pores of the carbon support contained in the catalyst composite to 60% to 80%, the pores having an average pore diameter of 10 nm or less, a desired power generation performance can be obtained in the wide range of conditions of low and high loads and low, high and excessive humidities.

The invention claimed is:

1. A method for producing a catalyst ink, for a catalyst composite in which a catalyst is supported on a carbon support with pores, comprising the steps of:

controlling a hydrophilic pores rate of the carbon support to 60% to 80%, and dispersing an ionomer in the catalyst composite after the controlling step, wherein the step of controlling further includes at least one step selected from the group consisting of the steps of:

acid treating the support in a range of from 70° C. to 80° C. with a nitric acid solution, before the catalyst is supported on the support; and firing the catalyst composite obtained by supporting the catalyst on the support, in a temperature range of from 150° C. to 250° C. in an inactive gas or reducing gas atmosphere, and wherein the hydrophilic pores rate is calculated by the following formula (1) using a contact porosimetry method:

Hydrophilic pores rate (%)=(hydrophilic pores volume/total pores volume)×100.    Formula (1)

2. The method for producing the catalyst ink according to claim 1, wherein an average pore diameter of the pores is 10 nm or less.

3. The method for producing the catalyst ink according to claim 1, wherein the step of controlling further includes the step of:

bringing the catalyst and the nitric acid solution into contact with the support when the catalyst is supported on the support.

4. The method for producing the catalyst ink according to claim 1, wherein the ionomer is dispersed in the catalyst composite with a ball mill in the dispersing step.

5. The method for producing the catalyst ink according to claim 1, wherein the ionomer is a perfluorosulfonic acid-based resin.

6. A method for producing a catalyst ink for a catalyst composite in which a catalyst is supported on a carbon support with pores, comprising the steps of:

controlling a hydrophilic pores rate of the carbon support to 60% to 80%, and dispersing an ionomer in the catalyst composite after the controlling, wherein the step of controlling further includes the steps of:

firing the support in a temperature range of from 150° C. to 2600° C. in an oxygen-containing gas atmosphere, before the catalyst is supported on the support, and wherein the oxygen-containing gas atmosphere is air atmosphere, dry air atmosphere or pure oxygen atmosphere, and wherein the hydrophilic pores rate is calculated by the following formula (1) using a contact porosimetry method:

Hydrophilic pores rate (%)=(hydrophilic pores volume/total pores volume)×100.    Formula (1)

* * * * *